United States Patent [19]

Gonzalez et al.

[11] Patent Number: 5,697,588
[45] Date of Patent: Dec. 16, 1997

[54] ADJUSTABLE DISPLAY MOUNT

[75] Inventors: Cesar A. Gonzalez; Nathaniel C. Herwig, both of Lawrenceville, Ga.

[73] Assignee: NCR Corporation, Dayton, Ohio

[21] Appl. No.: 681,691

[22] Filed: Jul. 29, 1996

[51] Int. Cl.$^6$ .................................................. A47B 96/06
[52] U.S. Cl. ...................... 248/221.11; 248/131; 248/922
[58] Field of Search .................. 248/221.11, 220.22, 248/222.11, 222.12, 222.13, 222.14, 278.1, 921, 922, 923, 917, 131, 285.1, 291.1; 439/11, 13, 324, 327

[56] References Cited

U.S. PATENT DOCUMENTS

| | | | |
|---|---|---|---|
| 1,775,577 | 9/1930 | Wilson . | |
| 4,576,372 | 3/1986 | Rinaldi | 272/146 |
| 4,687,167 | 8/1987 | Skalka et al. | 248/282.1 |
| 4,930,368 | 6/1990 | Nagano | 74/475 |
| 5,207,791 | 5/1993 | Scherbarth | 273/148 B |
| 5,268,675 | 12/1993 | Garthwaite et al. | 345/163 |
| 5,271,590 | 12/1993 | Rosen | 248/222.11 |
| 5,320,318 | 6/1994 | Chen | 248/286.1 |
| 5,385,901 | 1/1995 | Brodmann et al. | 248/921 X |
| 5,404,182 | 4/1995 | Nomura | 348/836 |
| 5,569,895 | 10/1996 | Lynch et al. | 248/923 X |
| 5,588,625 | 12/1996 | Beak | 248/923 X |

OTHER PUBLICATIONS

NCR, "NCR 7450 Hardware Installation & Service," p. 2–1, and three supplemental figures.

Primary Examiner—Ramon O. Ramirez
Attorney, Agent, or Firm—Francis L. Conte

[57] ABSTRACT

A display mount is provided for adjustably supporting a display on a foundation. The mount includes a base fixedly mountable to the foundation, and including a pintle extending upwardly, and an upwardly open race extending radially outwardly from the pintle. A display arm includes a gudgeon rotatably mounted on the pintle, and a socket spaced therefrom for supporting the display. The gudgeon includes a plurality of circumferentially spaced apart catches. A lockbar is disposed in the race for movement therein, and includes a latch for engaging the catches to restrain rotation of the display arm on the base. The latch is biased into engagement with one of the catches for restraining rotation of the display arm, and for also allowing manual sliding movement of the lockbar to disengage the latch from the catches for allowing rotation of the display arm on the base for adjusting position of the display.

12 Claims, 6 Drawing Sheets

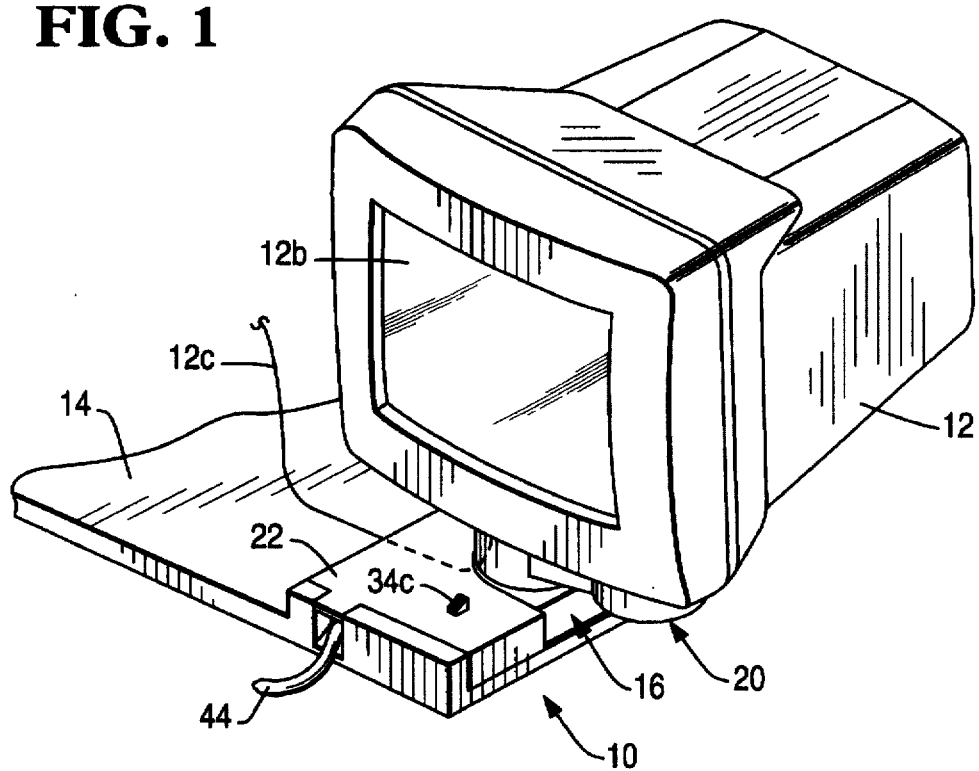
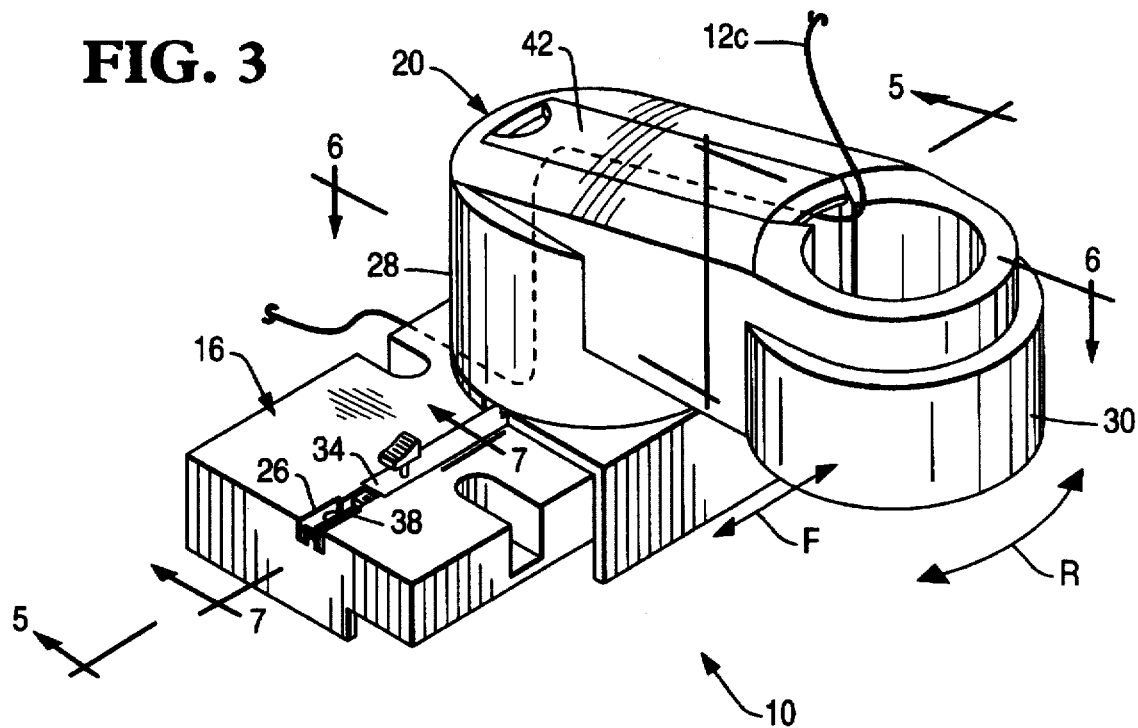

ADJUSTABLE DISPLAY MOUNT

BACKGROUND OF THE INVENTION

The present invention relates generally to retail transaction terminals, and, more specifically, to an adjustable mount for supporting a terminal display.

A typical retail transaction terminal includes a monitor or display, keyboard, laser scanner wand, and cash drawer all operatively joined to a computer processor for controlling the operation thereof. These components are suitably supported on a foundation such as a sales counter. Since different clerks or users typically use the same terminal, it is desirable for the display to be adjustable in position to match the ergonomic requirements of each different user.

The display provides a visual presentation of a retail transaction, and may be also used for inputting data instead of using a remote keyboard. The display may include a conventional touch screen which allows the user to touch different portions of the monitor for inputting data. In another embodiment, data key buttons are mounted directly adjacent to the monitor and again are pushed by the user for entering data.

Although it is desirable to adjust the position of the display for different users, it is undesirable for the display to inadvertently change its position under low levels of force applied to the display such as that level of force associated with pushing data entry keys on the display or monitor itself. Mounting a monitor with a relatively simple friction joint is undesirable since the resulting plastic-to-plastic contact in the joint, and large variation in manufacturing tolerance adversely affect performance of the joint. Friction contact results in friction wear and joint degradation over time, and undesirable squeaking of the joint. And, such a friction joint does not provide locking of the monitor at a specific position.

SUMMARY OF THE INVENTION

A display mount is provided for adjustably supporting a display on a foundation. The mount includes a base fixedly mountable to the foundation, and including a pintle extending upwardly, and an upwardly open race extending radially outwardly from the pintle. A display arm includes a gudgeon rotatably mounted on the pintle, and a socket spaced therefrom for supporting the display. The gudgeon includes a plurality of circumferentially spaced apart catches. A lockbar is disposed in the race for movement therein, and includes a latch for engaging the catches to restrain rotation of the display arm on the base. The latch is biased into engagement with one of the catches for restraining rotation of the display arm, and for also allowing sliding movement of the lockbar to disengage the latch from the catches for allowing rotation of the display arm on the base for adjusting position of the display.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is an isometric view of a display mount in accordance with one embodiment of the present invention for adjustably supporting a display on a foundation.

FIG. 3 is an enlarged, isometric view of the display mount illustrated in FIGS. 1 and 2 showing a display arm adjustably mounted to a base using a sliding lockbar.

DESCRIPTION OF THE PREFERRED EMBODIMENT(S)

Figure 2:
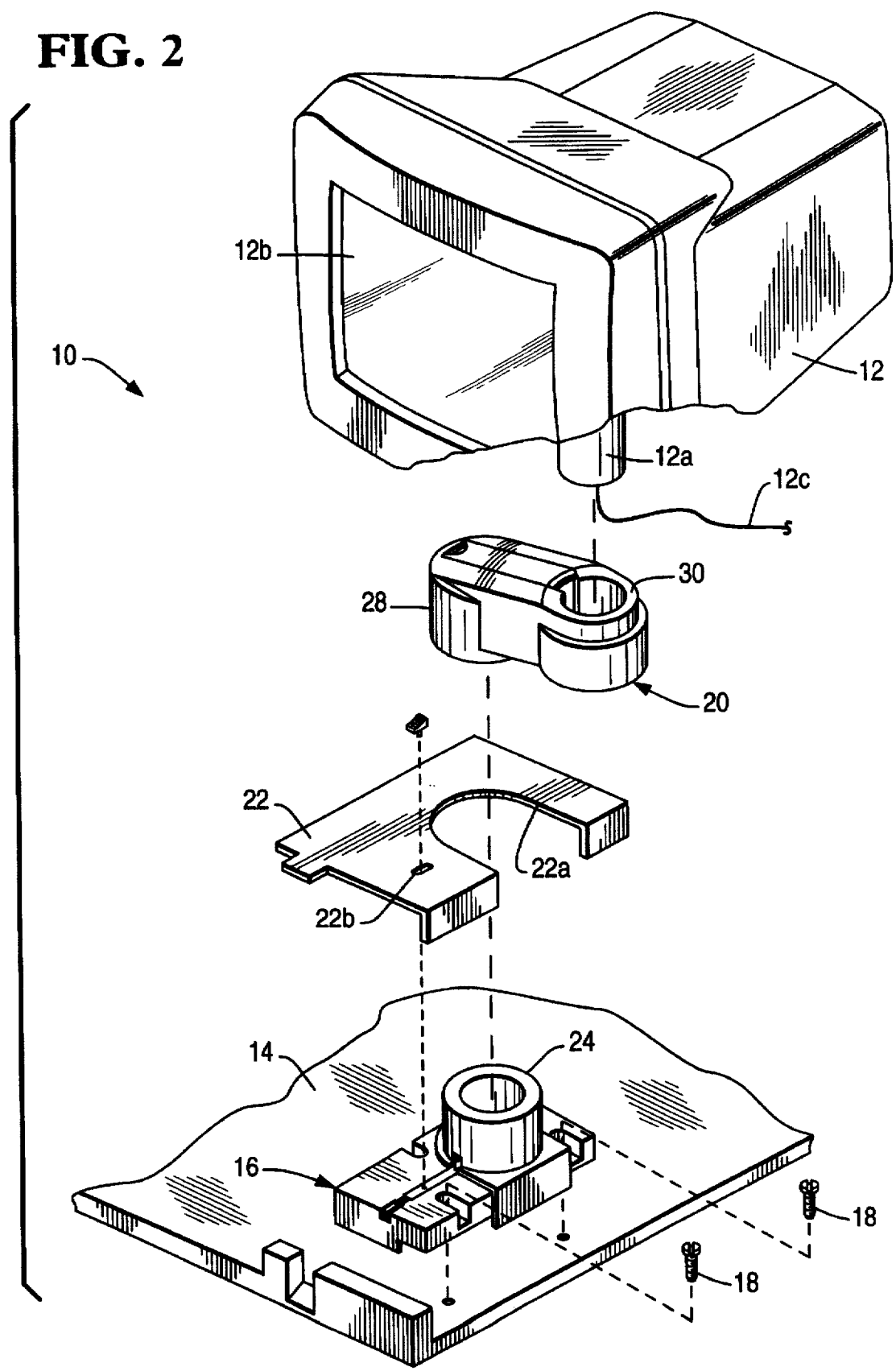
FIG. 2 is an exploded view of the display mount illustrated in FIG. 1.

Illustrated in FIGS. 1 and 2 is a display mount 10 in accordance with an exemplary embodiment of the present invention. The mount 10 is an assembly of components for adjustably mounting or supporting a conventional electrical display or monitor 12 on a suitable stationary foundation 14, which may take any conventional form such as a sales counter, or vertical post, or a suitable platform resting thereon.

The mount 10 includes a base 16 in the exemplary form of a rectangular block which may be formed of a suitable plastic, by molding for example. The base 16 includes a plurality of suitable apertures therethrough which receive conventional fasteners such as screws 18 for fixedly mounting the base 16 to the foundation 14 to provide a stationary support. Although the base 16 is specifically configured for being mounted atop the flat foundation 14, it may also be configured for mounting atop a conventional vertical post if desired.

A display arm 20 is rotatably mounted on the base 16 for selective rotation movement thereon in accordance with the present invention. In turn, the display 12 is mounted on the display arm 20 and is thereby selectively adjustable in position upon rotation of the arm 20 when desired. In the exemplary embodiment illustrated, a suitable cover 22, which may be plastic for example, covers the base 16 for providing a clean appearance, and may be suitably joined thereto using conventional snap fitting latches and hooks for example.

Figure 4:
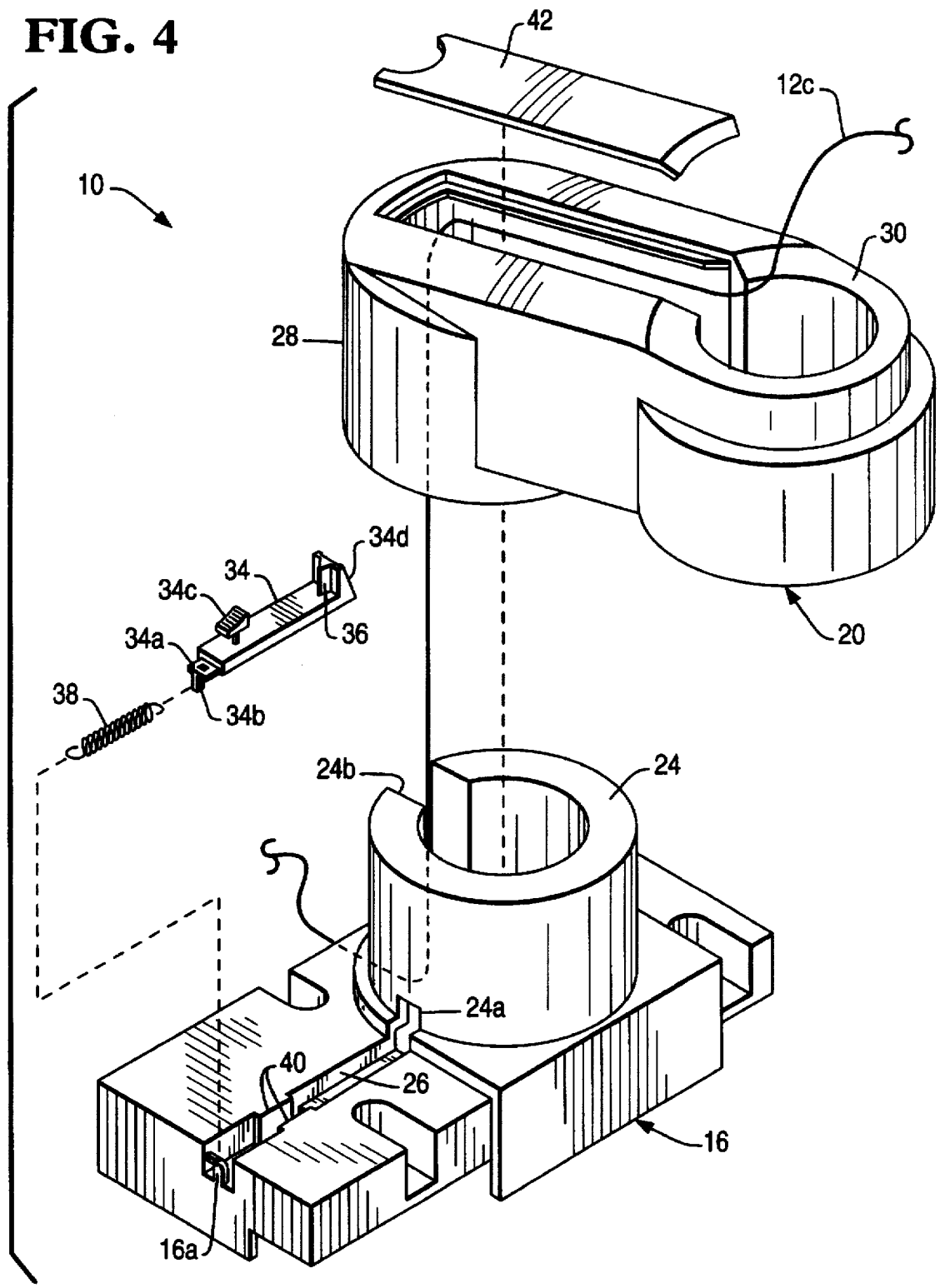
FIG. 4 is an exploded view of the display mount illustrated in FIG. 3.

The display mount 10 itself is illustrated in more particularity in FIGS. 3 and 4. The base 16 includes an annular pintle 24 which extends upwardly from one end thereof. The base 16 adjacent to the pintle 24 is preferably flat and includes an upwardly open race or U-shaped channel 26 extending radially outwardly from the pintle 24 along the top surface of the base. Since the base 16 is preferably formed of lightweight plastic, it is preferably hollow and includes various internal ribs or flanges which define its configuration and provide suitable rigidity for supporting the pintle 24 and display 12 thereon.

The display arm 20 is also preferably formed of plastic and includes a vertical tubular hub or gudgeon 28 at a proximal end thereof which is rotatably mounted on the pintle 24 in a simple friction fit therebetween. The gudgeon 28 is simply lowered atop the pintle 24 and rests thereon by gravity in coaxial alignment therewith. A vertically extending tubular socket 30 is disposed at an opposite or distal end of the display arm 20 for supporting the display 12 thereon. As shown in FIG. 2, the display 12 includes a bottom pin or tubular trunnion 12a which is centered under the display 12 and vertically engages the socket 30 in a simple friction fit therewith. In this way, the display 12 may be simply lowered atop the display arm 20 with the trunnion 12a engaging the socket 30 for supporting the display 12 atop the display arm 20.

In the exemplary embodiment illustrated in FIGS. 1 and 2, the display 12 includes a conventional touch screen 12b which allows a user to simply press different portions of the screen for entering data into the computer processor (not shown) through the display 12 itself. A suitable display cable 12c extends from the display 12 downwardly and outwardly through the center of the trunnion 12a and is suitably routed to the computer processor and operatively joined therewith for displaying visual images upon the touch screen 12b, as well as for carrying data input back to the processor when entered through the touch screen 12b. The display cable 12c is preferably routed through the display arm 20 as described in more detail hereinbelow.

Figure 5:
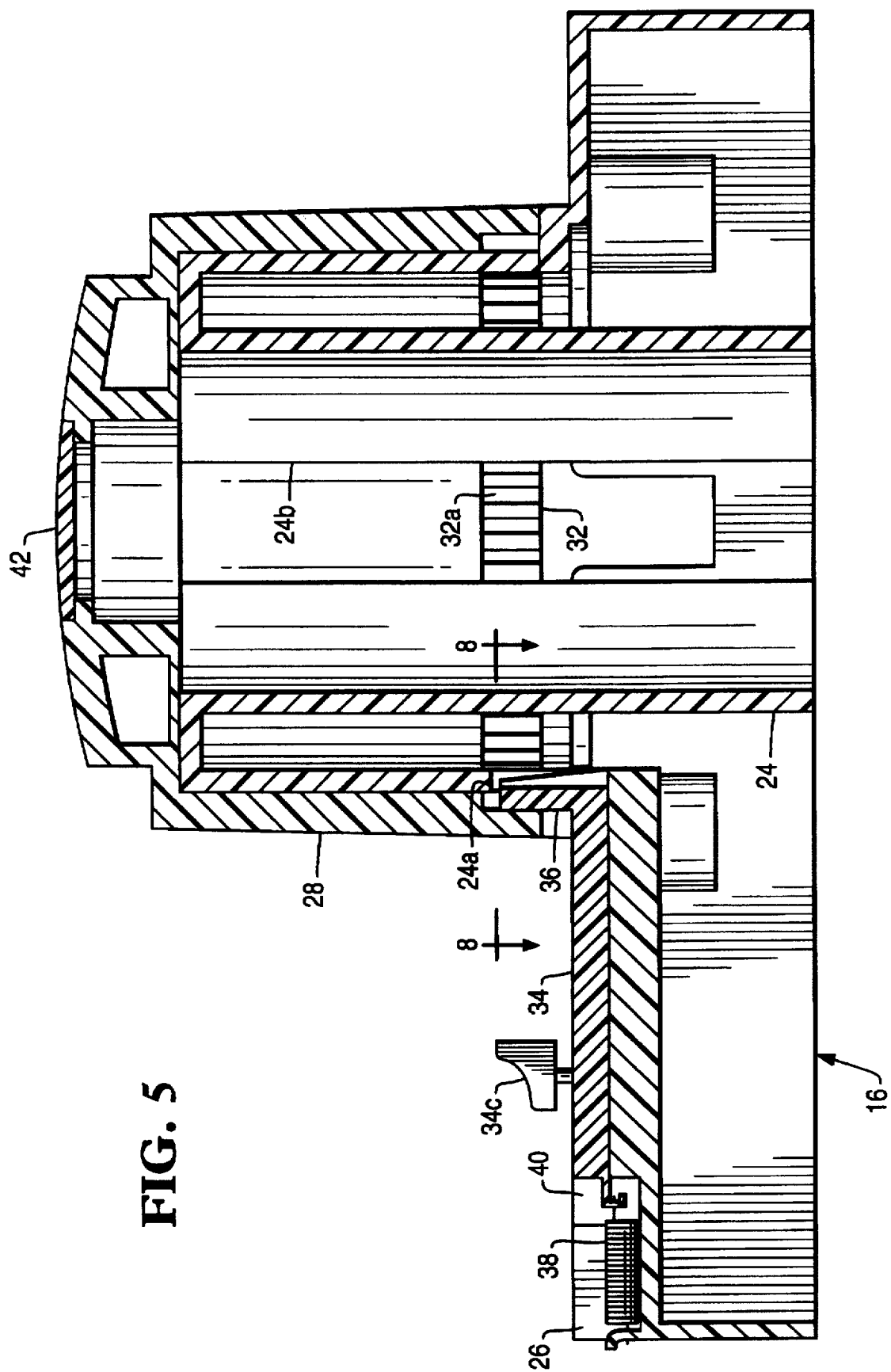
FIG. 5 is an elevational, partly sectional view through the display mount illustrated in FIG. 3 and taken along line 5—5.
Figure 6:
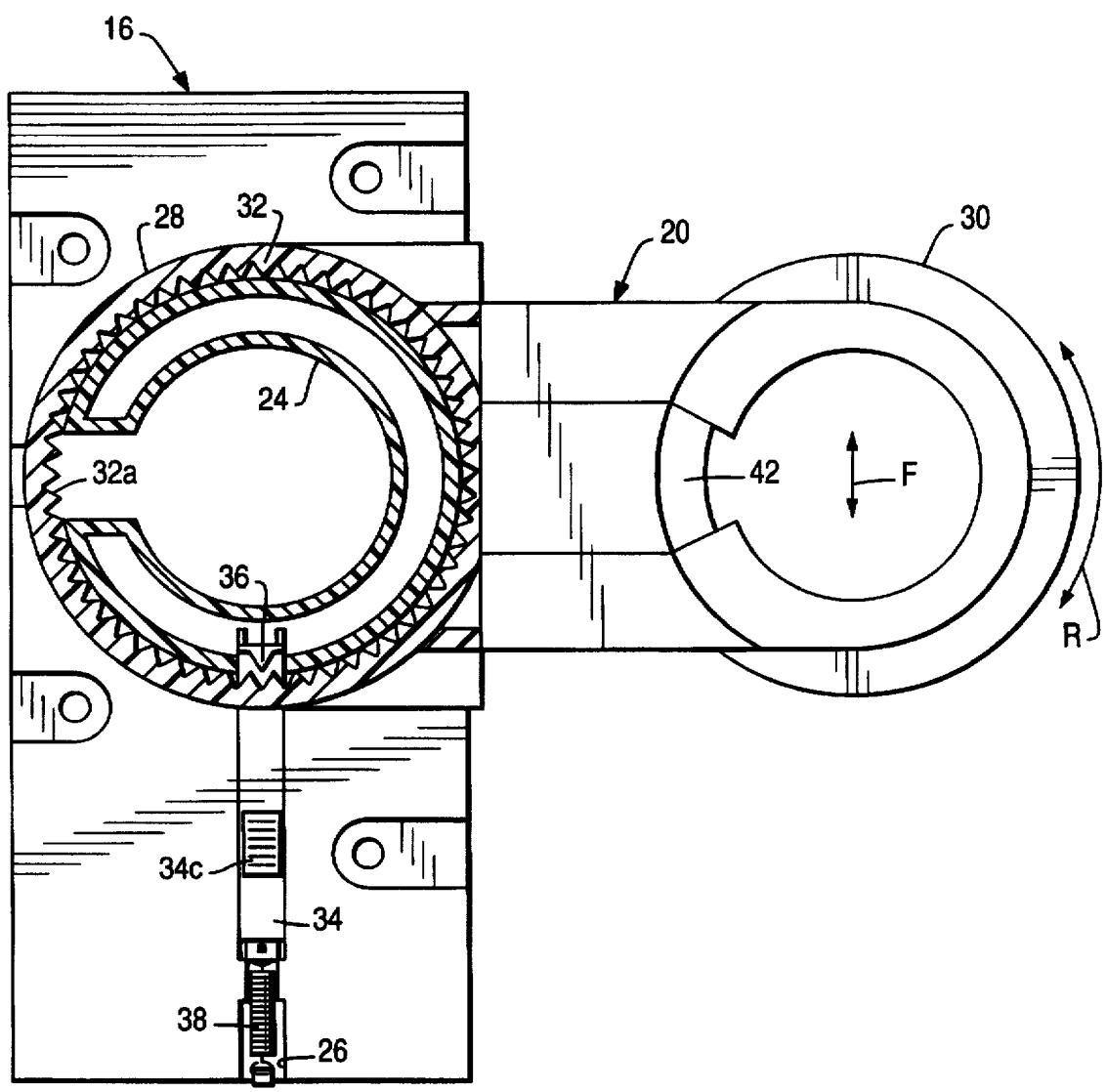
FIG. 6 is a top, partly sectional view of the display mount illustrated in FIG. 3 and taken along the stepped line 6—6.

As illustrated in FIGS. 5 and 6, the gudgeon 28 includes a plurality of circumferentially spaced apart catches 32a which are in the preferred form of an internal ring gear 32 disposed coaxially with the gudgeon 28, and preferably in an integral, one-piece construction therewith.

Referring again to FIGS. 3 and 4, the race 26 is preferably elongate and straight, and a complementary elongate lockbar 34 is disposed in the race 26 for longitudinal sliding movement therein. As shown in more detail in FIG. 4, the lockbar 34 includes a latch 36 in the exemplary form of a locking gear tooth which is complementary with the catches or gear teeth 32a for engagement therewith. The latch 36 is disposed at a distal end of the lockbar 34 and is positioned in the race 26 as shown in more particularity in FIGS. 5 and 6 for engaging the catches 32a of the ring gear 32 to restrain or prevent rotation of the display arm 20 on the base 16 in normal operation.

As shown in FIGS. 4 and 5, means in the exemplary form of a tension spring 38 are provided for resiliently biasing the latch 36 into engagement with at least one of the catches 32a for restraining both clockwise and counterclockwise rotation R of the display arm 20 against an applied turning force F as illustrated in FIGS. 3 and 6. The spring 38 is also effective for allowing manual sliding movement of the lockbar 34 to selectively disengage the latch 36 from the catches 32a for allowing both clockwise and counterclockwise rotation of the display arm 20, and display 12 supported thereon, on the base 16 without restraint from the latch 36.

Figure 7:
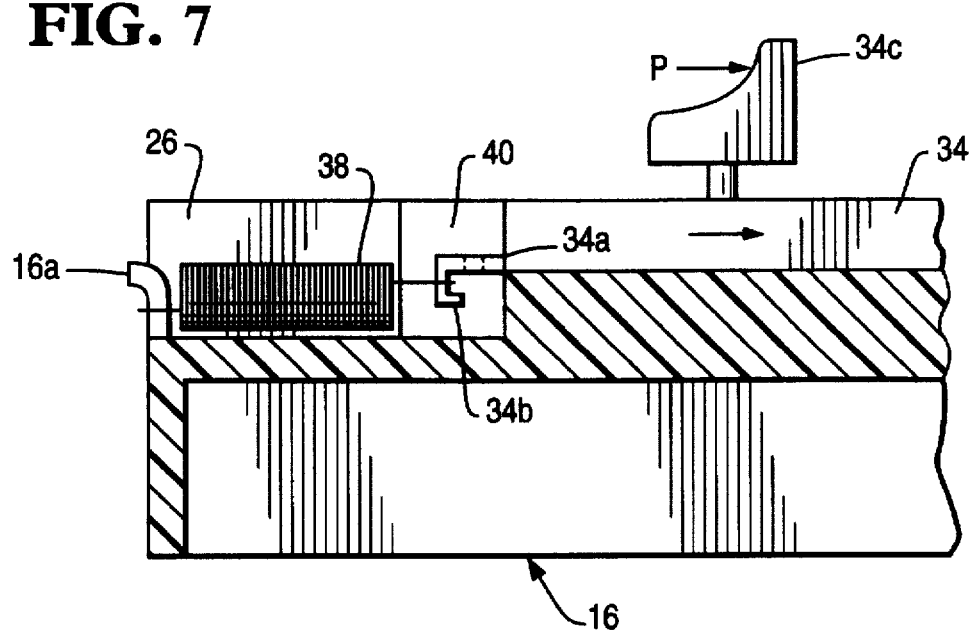
FIG. 7 is an enlarged, elevational view through a portion of the display mount illustrated in FIG. 3 and taken along line 7—7 illustrating a portion of the slidable lockbar in accordance with one embodiment of the present invention for controlling rotation between the display arm and the base.

More specifically, FIGS. 4 and 7 illustrate in more particularity an exemplary embodiment of the spring 38 mounted to the lockbar 34. In this embodiment, the lockbar 34 includes an integral step or recess 34a at its proximal end opposite to the latch 36 from which extends a suitable latch hook 34b. Since the lockbar 34 is preferably made of plastic, the various portions of the lockbar 34 may be suitably formed by conventional molding for example. Formed integrally with the base 16 in the furthermost end of the race 26 away from the pintle 24 is a suitable base hook 16a positioned for longitudinal alignment with the latch hook 34b on the lockbar 34. The spring 38 is a tension spring in this exemplary embodiment and has opposite end loops which suitably engage respective ones of the latch hook 34b and the base hook 16a.

Figure 8:
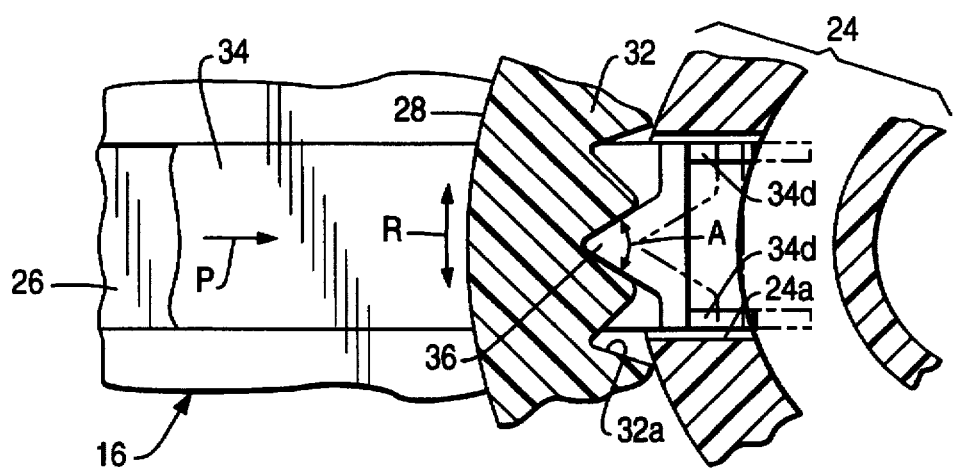
FIG. 8 is an enlarged, top view, partly in section, of a portion of the lockbar illustrated in FIG. 5 and taken along line 8—8.

The spring 38 is suitably sized in length so that it is initially stretched in tension when installed for providing a self-made deploying force for pulling the lockbar 34, and in turn the latch 36 into engagement with adjacent ones of the catches 32a as illustrated for example in FIGS. 5 and 8. In this exemplary configuration, the spring 38 is operatively joined between the base 16 and the proximal end of the lockbar 34 for effecting an initial biasing spring force to position the lockbar 34 in a deployed position for engaging the latch 36 with one of the catches 32a. This normally deployed or engaged position as illustrated in FIG. 8 ensures engagement of the latch 36 and the cooperating catches 32a for restraining or preventing unintended rotation of the gudgeon 28 and in turn the display arm 20.

The latch 36 and the cooperating catches 32a may take various configurations for preventing unintended rotation of the display arm 20 relative to the base 16. For example, these components may have square teeth (not shown), although the generally V-shaped teeth are preferred. The latch 36 and catches 32a are preferably in the form of complementary, generally V-shaped teeth each having an included angle A sized for allowing a predetermined release force acting on the display arm 20 to effect camming action therebetween to intermittently disengage the latch 36 from the catches 32a and allow the display arm 20 to rotate on the pintle 24 notwithstanding the initial force supplied by the stretched spring 38.

In this way, if the display 12 is unintentionally pushed with excessive force, the lockbar 24 will intermittently disengage for allowing rotation of the display arm 20 for preventing excessive forces therein which could cause damage to the components thereof. In one embodiment, the latch 36 has an included angle A of about 60°, and the spring 38 has a spring rate of about 15 pounds per inch so that a turning force F acting on the display arm 20 as illustrated in FIG. 6, which exceeds about 10 pounds will cause camming disengagement of the latch 36 from the catches 32a.

The latch 36 and catches 32a may take other forms such as a cooperating pin in complementary holes. And, the biasing spring 38 may take other forms such as a compression spring (not shown) suitably mounted between the lockbar 34 and the base 16 so that initial compression thereof causes the latch 36 to normally engage the catches 32a.

In the exemplary embodiment illustrated in FIGS. 5 and 6 for example, the ring gear 32 is preferably disposed inside the gudgeon 28 and is integral therewith. The race 26 correspondingly extends in part under the gudgeon 28 adjacent to a portion of the ring gear 32. And the lockbar 34 similarly extends in part under the gudgeon 28 to position the latch 36 radially inwardly of the ring gear 32 for selective disengagement therefrom in a radially inward direction as shown in solid line in FIG. 6 and in phantom line in FIG. 8. In FIG. 8 for example, the latch 36 is illustrated in solid line in its deployed position engaging the catches 32a due solely to the initial tension of the spring 38. The lockbar 34 is therefore normally deployed or activated to prevent rotation of the display arm 20 relative to the base 16.

However, to simply adjust the rotary position R of the display arm 20, the lockbar 34 may be simply manually slid in the race 26 to retract or disengage the latch 36 from the catches 32a and thereby allow the gudgeon 28 to rotate without restraint from the latch 36.

In this embodiment, the lockbar 34 preferably includes an integral push button 34c as shown for example in FIGS. 4, 5, and 7. As shown in FIGS. 7 and 8, a manually applied pushing force P on the button 34c slides the lockbar 34 radially inwardly relative to the gudgeon 28 to disengage the latch 36 from the ring gear 32 in a retracted position for allowing unrestrained rotation of the display arm 20. Retraction of the lockbar 34 simply further extends the spring 38 temporarily until the pushing force is removed, which allows the spring 38 to return the lockbar 34 to its deployed and locked position.

In the preferred embodiment illustrated in FIGS. 5, 6, and 8, the race 26 extends additionally in part under the pintle 24, and the lockbar 34 correspondingly additionally extends in part under the pintle 24 to position the latch 36 radially between the gudgeon 28 and the pintle 24. As shown in FIGS. 4 and 8, the base of the pintle 24 adjacent to the race 26 includes a complementary aperture 24a for receiving the distal end of the lockbar 34 in the crowded spaced between the cooperating gudgeon 28 and pintle 24.

In the preferred embodiment illustrated in FIGS. 4 and 5 for example, the pintle 24 and the gudgeon 28 have complementary annular smooth surfaces engaging together in a friction fit for allowing frictional rotation therebetween upon rotation R of the display arm 20. The surfaces may be cylindrical or slightly conical if desired which will allow the display arm 20 to be easily mounted atop the pintle 24 by simply being lowered thereon and held in place by gravity.

As shown in FIG. 5 for example, the pintle 24 is preferably a hollow annular structure of double-wall construction having radially inner and outer walls and a hollow annulus therebetween. A suitable aperture 24a may be formed at the base of the outer wall of the pintle 24 as shown in FIG. 5 for receiving the distal end of the lockbar 34 and allowing it to be positioned in its retracted position without obstruction by the pintle 24 itself. In this way, the latch 36 is hidden from view and rigidly mounted for ensuring effective deployment of the lockbar 34.

More specifically, and referring to FIG. 8, the aperture 24a in the outer wall of the pintle 24 is illustrated in more particularity and is sized for receiving the distal end of the latch bar 34 in a suitably close fit. Since the lockbar 34 including the latch 36 is preferably formed of plastic, preventing excessive bending deflection thereof during engagement of the latch 36 is desired. When the latch 36 engages the catches 32a, force applied to the display arm 20 will tend to rotate the gudgeon 28 which will tend to laterally deflect the distal end of the lockbar 34. By positioning the sidewalls defining the pintle aperture 24a closely adjacent to the corresponding sides of the lockbar 34, lateral motion of the latch 36 will be restrained by abutting contact between the lockbar 34 and the pintle aperture 24a for providing a more rigid assembly which can better distribute applied loads for reducing overall stress and strain.

To additionally strengthen the lockbar 34 at the latch 36, it preferably also includes a pair of spaced apart, generally triangular reinforcing ribs 34d as shown in FIG. 8 which are integrally formed with the lockbar 34 on opposite lateral sides thereof for increasing the structural rigidity around the latch 36 for better carrying unintended turning loads on the display arm 20 where the latch 36 is engaged. By mounting the lockbar 34 itself in the corresponding race 26, lateral loads applied to the lockbar 34 are more evenly distributed into the base 16 for improving the effectiveness and useful life of the display lock mechanism.

As indicated above, different embodiments of the locking mechanism may be utilized including having an external ring gear (not shown) around the outer circumference of the gudgeon 28, which therefore requires the opposite orientation of the latch 36 to face radially inwardly for engaging the radially outwardly extending gear teeth. Additional modifications may also be introduced for suitably hiding this embodiment of the locking mechanism and improving its structural integrity if required.

Since the distal end of the lockbar 34 as illustrated in FIG. 5 for example is effectively trapped under the gudgeon 28 after assembly, it is thereby vertically and longitudinally retained in the race 26. It is desirable also to vertically retain the proximal or opposite end of the lockbar 34 in the race 26. This is preferably accomplished in an exemplary embodiment as illustrated in FIGS. 4 and 7 by providing in the base 16 a pair of opposing retention tabs 40 integrally molded therewith which straddle the top of the race 26 and are spaced radially away from the pintle 24 adjacent to the proximal end of the lockbar 34. The lockbar recess 34a is sized to engage the bottom of both tabs 40 for preventing vertically upward travel thereof. In this way, the tabs 40 are effective for vertically retaining the proximal end of the lockbar 34 in the race 26 and allows effective sliding operation of the lockbar 34 and installation thereof during assembly.

As shown in FIG. 4, the spring 38 may initially be mounted to the latch hook 34b and the base hook 16a and suitably stretched for allowing the lockbar 34 to be inserted into the race 26 with its distal end being inserted into the pintle aperture 24a. The lockbar recess 34a may then be inserted under the corresponding tabs 40 to position the lockbar 34 within the race 26. The lockbar 34 is therefore allowed to slide longitudinally relatively freely within the race 26, and radially relative to the pintle 24.

Referring again to FIG. 4, the pintle 24 is preferably tubular and includes a vertical slot 24b extending downwardly from the top of the pintle 24 and suitably inwardly into the base 16. A single slot 24b is provided at any suitable location for routing the display cable 12c internally through the display mount 10 for hiding it from view. Accordingly, the display arm 20 is preferably hollow and includes a removable top access panel 42 extending from the gudgeon 28 to the socket 30 for providing a continuous and uninterrupted channel or path from the socket 30, through the display arm 20 itself, and into the pintle 24, and out the base 16 for routing the display cable 12c from the display 12. During assembly of the components, the display cable 12c is threaded through the display arm 20, with the pintle slot 24b allowing its ready installation inside the pintle 24. The panel 42 is suitably removably mounted to the top of the display arm 20 in a snap fit arrangement, for example, to cover the cable 12c installed therein.

As shown in FIGS. 1 and 3, the display mount 10 has a relatively smooth outer appearance, with the display cable 12c being hidden from view. Although the display arm 20 may be selectively rotated as desired by individual users, the internal path provided for the display cable 12c is suitably large for allowing rotation of the arm 20 without damage to or interference with the display cable 12c.

As shown in FIGS. 1 and 2, the base cover 22 is suitably removably mounted to the base 16 to cover a majority thereof including the lockbar 34 to provide a smooth and neat appearance. The base cover 22 may have a suitable cutout 22a for receiving the pintle 24, and an aperture 22b for receiving or exposing the button 34c. Only the button 34c is directly exposed and accessible by the user for selectively adjusting the rotary position of the display arm 20 when desired. The user merely pushes the display button 34c forward as shown in FIG. 1 for disengaging the latch 36 from the gudgeon 28 which then allows simple pushing or pulling of the display 12 to rotate the display arm 20 to any desired position. The button 34c is released to reengage the latch 36 with the ring gear 32 and securely lock the display 12 at the desired position. As indicated above, if excessive force is inadvertently applied against the display 12, the ring gear 12 will intermittently disengage the latch 36 due to camming to allow the display 12 to be repositioned to relieve the applied force.

The base cover 22 as shown in FIG. 1 not only hides the internal workings of the base 16, but may also be used for hiding additional cables 44 required in the terminal such as those used for the laser scanner wand or separate keyboard (not shown).

Figure 9:
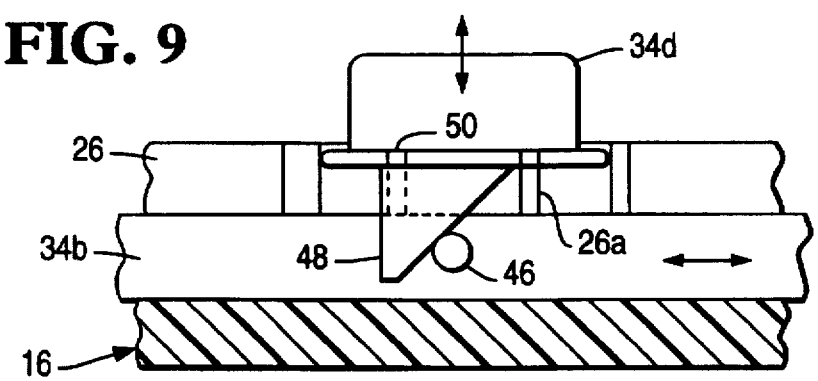
FIG. 9 is an elevational, partly sectional view of a portion of a lockbar in accordance with a second embodiment of the present invention having a different form of a push button mounted thereon.

Illustrated in FIG. 9 is a portion of an alternate embodiment of the lockbar, designated 34B, which is generally identical to the lockbar 34 disclosed above except for including a different push button 34d. In this embodiment, the push button 34d is a separate and distinct element which preferentially engages the lockbar 34B. The lockbar 34B includes a pair of oppositely, laterally extending integral pins 46 at an intermediate portion thereof. The push button 34d includes a pair of laterally spaced apart triangular arms 48, with each arm 48 engaging a respective one of the pins 46 at a suitable inclination angle, of about 45° for example, relative to the longitudinal axis of the lockbar 34B.

The push button 34d includes a pair of longitudinally spaced apart ribs 50 on opposite lateral sides thereof which are configured to engage complementary, vertically extending grooves 26a formed in the vertical walls of the race 26. In this arrangement, the push button 34d may be pushed downwardly with the ribs 50 sliding in the grooves 26a for guiding the downward motion of the push button and preventing the cocking thereof. The inclined arms 48 provide camming edges which engage the respective pins 46 which apply a longitudinal force thereon to slide the lockbar 34B toward the pintle 24. Upon release of the push button 34d, the spring 38 restores the lockbar 34B to its original position and pushes the button 34d upwardly. In this way, the lockbar 34B may be retracted when desired, and automatically returned to its deployed position upon removal of force from the button 34d.

In yet another embodiment of the invention (not shown), the coil spring 38 may be replaced with a suitable leaf spring. In one example, the lockbar 34 itself may be resilient along its length and suitably fixedly mounted at its proximal end. By deflecting or bending the lockbar from its nominal straight configuration, the distal end thereof may be displaced longitudinally for engaging or disengaging the latch thereat as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A display mount for adjustably supporting an electric display on a foundation comprising:

a base fixedly mountable to said foundation, and including a pintle extending upwardly from one end thereof, and an upwardly open race extending radially outwardly from said pintle in said base;

a display arm having a vertical gudgeon at one end thereof rotatably mounted on said pintle, and a vertical socket at an opposite end thereof for supporting said display, with said gudgeon including a plurality of circumferentially spaced apart catches;

a lockbar being complementary with and disposed in said race for longitudinal sliding movement therein, and including a latch at a distal end thereof for engaging said catches to restrain rotation of said display arm on said base; and means for biasing said latch into engagement with one of said catches for restraining rotation of said display arm, with said biasing means being effective also for allowing sliding movement of said lockbar to disengage said latch from said catches for allowing rotation of said display arm on said base.

2. A display mount according to claim 1 wherein said catches are in the form of a ring gear disposed coaxially with said gudgeon, and said latch is in the form of a gear tooth being complementary with said catches for engagement therewith.

3. A display mount according to claim 2 wherein:

said ring gear is disposed inside said gudgeon;

said race extends in part under said gudgeon adjacent to a portion of said ring gear; and said lockbar extends in part under said gudgeon to position said latch radially inwardly of said ring gear for selective disengagement therefrom.

4. A display mount according to claim 3 wherein said biasing means comprise a spring operatively joined between said base and said lockbar for effecting an initial biasing force for engaging said latch with one of said catches.

5. A display mount according to claim 3 wherein:

said race extends in part under said pintle; and said lockbar extends in part under said pintle to position said latch radially between said gudgeon and pintle.

6. A display mount according to claim 5 wherein said base further comprises a pair of opposing tabs straddling said race and spaced radially away from said pintle for vertically retaining said lockbar in said race.

7. A display mount according to claim 6 further comprising a push button joined to said lockbar for manually sliding said lockbar in said race to disengage said latch from said gudgeon.

8. A display mount according to claim 7 further comprising a cover removably mounted to said base to cover said lockbar, and including an aperture for exposing said button.

9. A display mount according to claim 3 wherein:

said pintle is tubular and includes a vertical slot extending downwardly into said base; and said display arm is hollow and includes a removable panel extending from said gudgeon to said socket for providing a continuous channel from said socket, through said display arm, into said pintle, and out said base for routing an electrical cable from said display.

10. A display mount according to claim 9 further comprising said display, and wherein said display includes a bottom trunnion vertically engaging said socket, and said display cable extends through said trunnion and into said display arm.

11. A display mount according to claim 3 wherein said pintle and gudgeon have complementary annular surfaces engaging together in a friction fit for allowing frictional rotation therebetween upon rotation of said display arm.

12. A display mount according to claim 3 wherein said latch and catches are in the form of complementary, generally V-shaped teeth each having an included angle sized for allowing a predetermined release force on said display arm to effect camming action therebetween to intermittently disengage said latch and allow said display arm to rotate on said pintle notwithstanding said biasing means.

* * * * *